Figure 10:
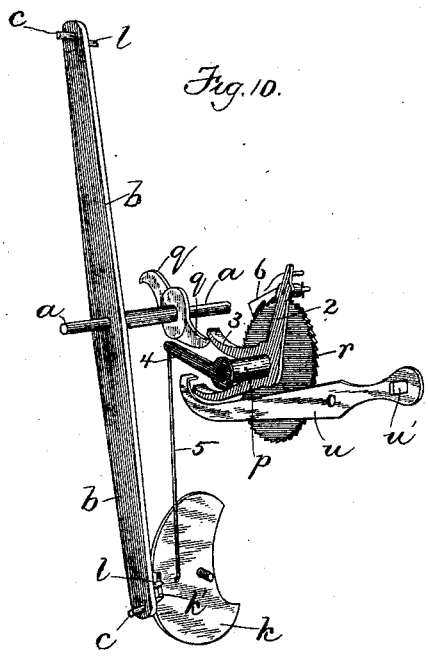

(No Model.) 3 Sheets—Sheet 1.
W. D. OLNEY.
DEVICE FOR TESTING WATCH BALANCES.
No. 422,616. Patented Mar. 4, 1890.
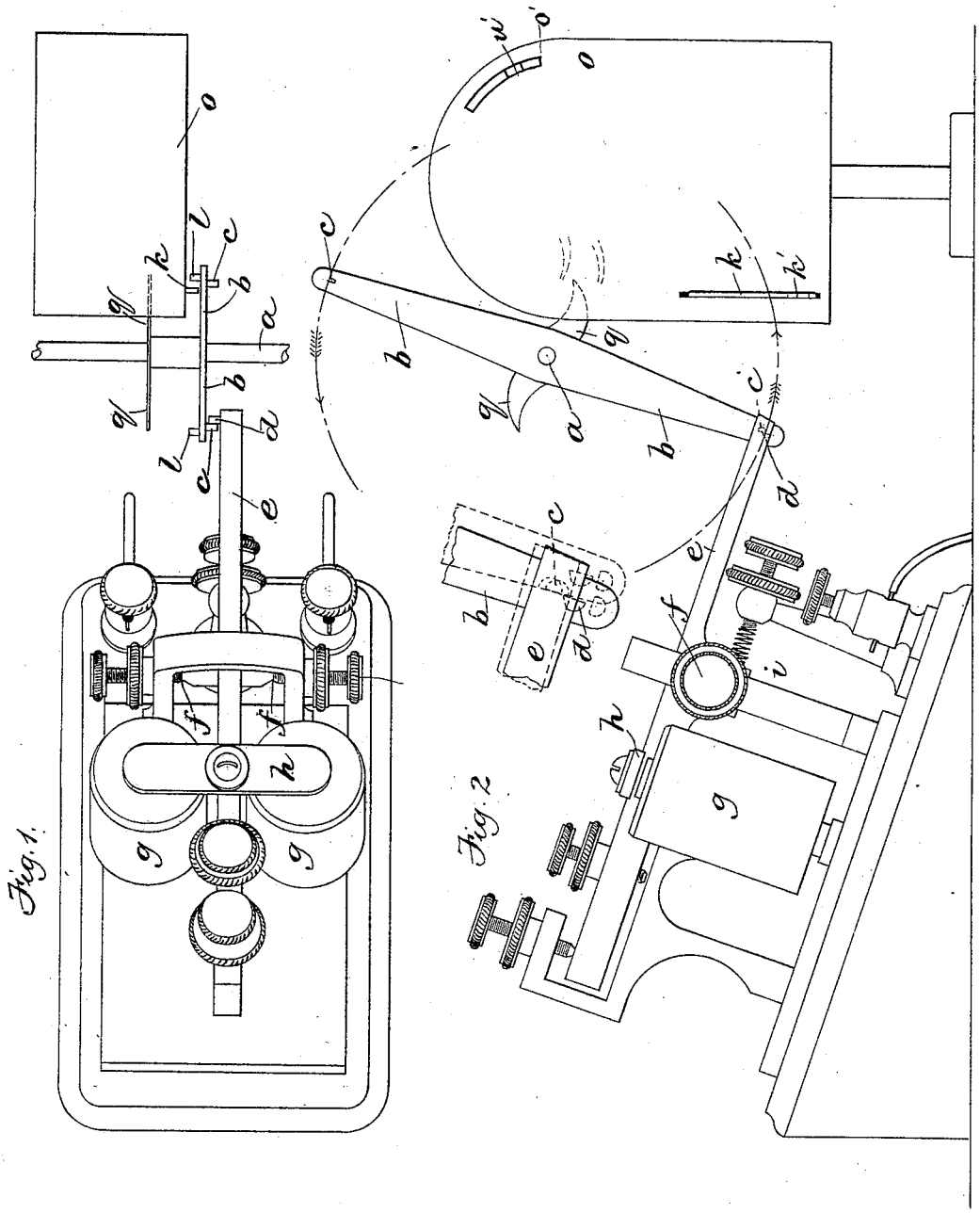
WITNESSES:
INVENTOR
ATTORNEYS

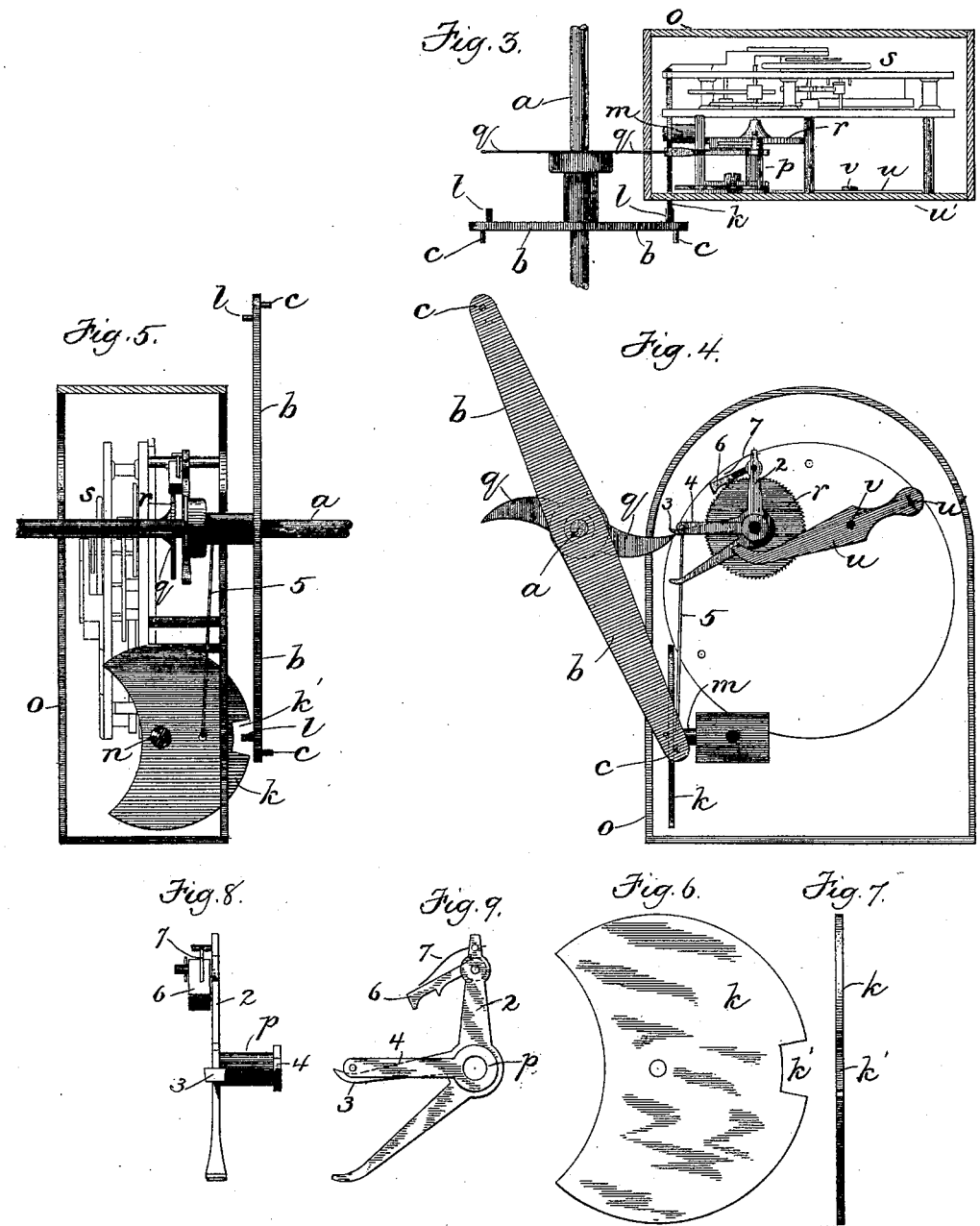

(No Model.)  W. D. OLNEY.  3 Sheets—Sheet 3.
DEVICE FOR TESTING WATCH BALANCES.
No. 422,616.  Patented Mar. 4, 1890.

UNITED STATES PATENT OFFICE.

WILLIAM D. OLNEY, OF WALTHAM, MASSACHUSETTS, ASSIGNOR TO THE AMERICAN WALTHAM WATCH COMPANY, OF SAME PLACE.

DEVICE FOR TESTING WATCH-BALANCES.

SPECIFICATION forming part of Letters Patent No. 422,616, dated March 4, 1890.

Application filed November 12, 1889. Serial No. 329,998. (No model.)

*To all whom it may concern:*

Be it known that I, WILLIAM D. OLNEY, of Waltham, in the county of Middlesex and State of Massachusetts, have invented certain new and useful Improvements in Devices for Detecting Irregularities in the Operation of a Time-Movement or Clock, of which the following is a specification.

This invention relates to the method of testing and grading watch-balances and hair-springs by vibration, described in Letters Patent No. 329,915, granted to John Logan, November 10, 1885, and to the apparatus for carrying said method into practice, described in Letters Patent No. 360,234, granted to E. A. Marsh, John Logan, and D. H. Church, March 29, 1887, said method involving the vibration of the balances and hair-springs to be tested for a period or given length of time and noting the rate of the vibration during said period. The apparatus shown in said Patent No. 360,234 includes a series of standard time trains or movements, each of which is adapted to detachably hold a balance and hair-spring to be tested, and devices for automatically stopping each of said trains after it has run a given length of time, said automatic stopping devices including a shaft which is arranged parallel with the series of time-trains, and is rotated by a governing or motor clock, and a series of detent-wheels connected by friction with said shaft and notched so that when each wheel has made a complete rotation its notch engages a detent-lever accompanying one of the balance-testing trains, and thereby stops the operation of the latter, each detent-wheel being enabled by its frictional connection with the carrying-shaft to stop independently of the others, so that while the shaft is rotated continuously by the governing-clock any one or all of the testing-trains may be stopped when its period of operation has expired. It is of the first importance that the rate of movement or operation of the governing-clock be uniform, so that the time that elapses between the starting and stopping of each balance shall always be the same. It has been found that by the employment of an electro-magnet or relay controlled by a standard clock as the means of controlling the motor-clock of the apparatus greater accuracy and uniformity in the running of the motor-clock are obtained when the relay is in proper working order than can be attained by the use of a pendulum forming a part of the organization of the clock. It is a fact, however, that the relay may occasionally be caused, by variations in the strength of the battery or by other causes, to fail in its operation, and in the event of such failure the governing-clock will not run at the proper rate, so that the balances being tested will vibrate longer than the predetermined period, and the recorded rate of vibration will show a greater number of vibrations than actually occurred during the predetermined or supposed period of vibration, thus rendering the test of no value.

My invention has for its object to provide a means for detecting any failure or irregularity in the operation of the governing-clock and automatically stopping the same in the event of a deviation from the proper rate of operation, so that infallible proof of the irregularity will be furnished, which will show the operator that the testing operation must be repeated.

To this end my invention consists, mainly, in the combination, with the controlling mechanism of a motor or governing clock, of a movable stop or detent, which is given an oscillating or reciprocating movement by the conjoint action of the said clock and by an independent time-train, the clock giving the said detent a movement in one direction, while the independent train gives it a movement in the opposite direction. The stop or detent is arranged in the path of a revolving arm or other moving part connected with the governing-clock mechanism, and the arrangement is such that in the event of a slight irregularity in the rate of movement of said clock the detent during the movement imparted to it by the independent train will arrest said arm, and thereby stop the operation of the clock; but so long as the clock is running at the proper rate the detent will not arrest said arm.

Figure 11:
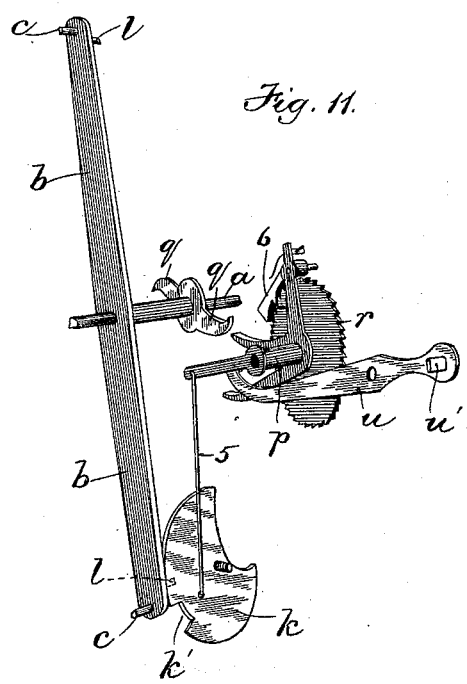

In the accompanying drawings, forming a part of this specification, Figure 1 represents a top plan view of a portion of the escapement-shaft of the governing-clock, the relay that controls the operation of said clock, the casing that contains the stop or detent, and the independent train that moves said detent in one direction, a portion of the detent being shown projecting from said casing. Fig. 2 represents a side elevation of the parts shown in Fig. 1. Fig. 3 represents a plan view, Fig. 4 a side elevation, and Fig. 5 a rear elevation, of a portion of said shaft, its arms, the detent, the devices through which the detent is moved in one direction by the rotation of the shaft, and the independent train that moves the detent in the opposite direction, the casing containing said detent and independent train being shown as partly removed to show the mechanism within it. Fig. 6 represents a side and Fig. 7 an edge view of the detent. Fig. 8 represents an edge and Fig. 9 a side view of portions of the devices through which the detent is operated. Figs. 10 and 11 represent perspective views of the detent and its operating mechanism, together with a portion of the clock-shaft and its arms, the detent being shown in position to permit the rotation of said shaft in Fig. 10 and in position to arrest the shaft in Fig. 11.

The same letters of reference indicate the same parts in all of the figures.

In the drawings, $a$ represents the escapement-shaft of the governing-clock train that operates the shaft having the series of detent-wheels, whereby the series of balance-testing trains are arrested after running a predetermined period, as shown in Patent No. 360,234, above referred to. In said patent the escapement shown is entirely mechanical in its operation, and its action is controlled by a pendulum forming a part of the motor-clock. In the present case the escapement is controlled electrically, and the clock is not provided with a pendulum.

With the exception of the electro-mechanical means hereinafter described for controlling the operation of the motor-clock, the apparatus as a whole is constructed substantially as shown in said Patent No. 360,234, and reference may be had to said patent for a full description of the apparatus and of the method of testing watch-balances, to which the present invention relates.

The escapement-shaft $a$ has two arms $b\ b$, provided with detents $c\ c$, which are arrested at each half-rotation of the shaft by a detent $d$ on a lever $e$, which is pivoted at $f\ f$, Figs. 1 and 2, and is controlled by an electro-magnet $g\ g$, the armature $h$ of which is affixed to the lever $e$, said electro-magnet and the necessary electrical connections therewith constituting a relay. When the armature is held away from the poles of the magnet by the retracting-spring $i$, Fig. 2, the detent $d$ is in position to arrest one of the pallets $c$, and thereby arrest the shaft $a$ and the governing-clock train. When the armature is attracted by the closure of the circuit, it releases the pallet $c$ which it engaged, and permits the shaft $a$ to rotate until it is again arrested. The circuit is closed at regular intervals by an electric clock acting through suitable electro-mechanical mechanism, which it is not necessary to here describe, such mechanism being well known and forming no part of my invention.

In the machine embodying the invention here shown and claimed the circuit is closed every two seconds, and the closure is so brief that the armature $h$ is released and the lever $c$ resumes its normal position in time to arrest the other arm $b$ when its pallet $c$ reaches the pallet or detent $d$, so that the escapement-shaft is arrested after each half-rotation.

$k$ represents the detent, which is here shown as a flat metal plate having a segmental edge, in which is cut a recess $k'$. Said detent is pivoted at $n$ to a fixed stud $m$, within a casing $o$, a portion of the detent projecting through a slot in one side of said casing, as shown in Figs. 1, 2, 3, and 4. The projecting portion of the detent is in the path of two studs $l\ l$, projecting laterally from the arms $b\ b$, so that unless the recess $k'$ coincides with said pins, as shown in Figs. 5 and 10, and thus permits the said pins to pass the detent, one of the pins will strike the detent, as shown in Fig. 11, so that the shaft $a$ will be arrested by the detent. The shaft $a$ is provided with two arms $q\ q$, which are arranged to project alternately through a slot in the rear portion of the casing $o$.

$p$ represents a sleeve mounted to turn freely on a fixed stud in the casing $o$, and having arms 2 3 4 rigidly affixed to it. The arm 3 is arranged to stand in the path through which the shaft-arms $q\ q$ move, so that when said shaft is rotating one of the arms $q$ will act on the arm 3, and thereby raise the same with the connected arms 2 4. The arm 4 is connected by a rod 5 with the detent $k$, so that whenever said arm is raised it will turn the detent on its pivot in such direction as to raise the recess $k'$. The arm 2 has pivoted to it a pawl 6, which is held by a spring 7, or by gravitation, in contact with a ratchet-wheel $r$, which is affixed to one of the arbors of an independent time-train $s$, located in the casing $o$, said train being of any suitable construction and adapted to rotate the ratchet-wheel $r$ continuously and at a uniform rate.

The operation of the described devices is as follows: At each release of the shaft $a$ by the described action of the relay, and during the ensuing half-rotation of the shaft $a$, one of the arms $q$ on said shaft raises and then releases the arm 3, and with it the arms 2 and 4, thus raising the recess $k'$ of the detent and drawing the pawl 6 backwardly along the periphery of the ratchet $r$. Upon the release of the arm 3 the arms 2, 3, and 4 move in the opposite direction, their movement being controlled by the rotation of the ratchet of the ratchet-wheel $r$, the teeth of which are engaged with the pawl 6. The described upward movement and release of the detent take place before the arm $b$ last released by the action of the relay, reaches the detent, the downward movement of the detent taking place while the said arm *b* is approaching the detent. If the movement of the arm *b* is strictly on time its stud *l* coincides with the recess *k'* at the moment the arm reaches the detent, as shown in Figs. 5 and 10, so that the stud *l* passes through the recess and the detent has no effect on the governing-clock; but in case the arm *b* is behind time by reason of failure of the relay to act promptly, the recess *k'* will have passed below the stud *l* on said arm, so that the detent will arrest said stud, as shown in Fig. 11, and thus stop the rotation of the shaft *a* and the operation of the clock, the latter remaining inoperative until the operator raises the detent to permit the arrested stud *l* to pass through the recess *k'*. It will be seen, therefore, that any irregularity in the operation of the governing-clock is at once detected, so that there is no possibility of an accidental increase or decrease of the predetermined period of vibration of the balances being tested. A lever *u* is pivoted at *v* to the casing *o*, and is arranged so that its free end will bear against the arm 3 when the lever *u* is raised. The object of the lever *u* is to raise the detent *k* and the pawl 6 at the commencement of the operation, or after the governing-clock has been stopped by the detent, as above described. The said lever is provided with a pin *u'*, which projects through a slot in the casing *o* and enables the operator to raise the lever.

I do not limit myself to the described form of the detent *k* here shown, nor to the described details of mechanism whereby the detent is moved alternately by the governing-clock and by the independent train *s*, as the same may be variously modified without departing from the spirit of my invention.

The described improvement may be used as a means for detecting irregularities in the operation of a clock and for other purposes than that here described.

It is obvious that the arms carrying the detent-engaging studs *l* may be independent of the arms that carry the studs or pallets *c*.

I claim—

1. As a means for detecting irregularities in the operation of a governing-clock or time-movement, the combination, with an arm or member moved by the operation of the clock, of a movable detent arranged to project into the path of said arm at a given point or points in its movement, an independent train or time movement, and intermediate means whereby the detent is moved first in one direction by the governing-clock and then in the opposite direction by the independent time-movement, as set forth.

2. The combination of a shaft *a*, forming a part of a governing-clock or time-movement, and provided with arms *b*, means for letting off said shaft step by step, a movable detent pivoted to a fixed support and arranged to project into the path of said arms during parts of its movement and to clear said path at a given point in said movement, a pivoted lever 3, arranged to be moved by an arm on the shaft *a*, connections between said lever 3 and the detent, through which motion in one direction is communicated to the detent from said lever, an independent time-movement having a ratchet-wheel which is rotated continuously by said movement, a movable pawl engaged with said ratchet, and a connection between said pawl and the lever 3, whereby the pawl is retracted upon the ratchet by the described movement of said lever, the ratchet controlling the opposite or return movement of the detent, as set forth.

3. The combination of a shaft *a*, forming a part of a governing-clock or time-movement and provided with arms *b*, means for letting off said shaft step by step, a movable detent pivoted to a fixed support, said detent being in the path of the arms *b* during parts of its movement, and having a recess which permits said arms to pass the detent when the latter is in a given position, connections between the shaft *a* and the detent, whereby the latter is moved in one direction to carry the said recess to one side of the path of said arms, and means for moving the detent in the opposite direction at a predetermined rate to carry the recess across the said path, as set forth.

4. The combination of a shaft *a*, forming a part of a governing-clock or time-movement, and provided with arms *b*, means for letting off said shaft step by step, a movable detent pivoted to a fixed support, said detent being in the path of the arms *b* during parts of its movement, and having a recess which permits said arms to pass the detent when the latter is in a given position, a series of connected arms pivoted to a fixed support, one of said arms being connected with the detent and another arranged to be moved by arms or projections affixed to the shaft *a*, a pawl pivoted to another of said arms, and an independent time-movement having a ratchet-wheel which is engaged by said pawl, as set forth.

5. The combination, with the connected arms 2 3 4, pawl 6, detent *k*, and ratchet *r*, of the setting-lever *u*, arranged to move said arms, pawl, and detent, as set forth.

In testimony whereof I have signed my name to this specification, in the presence of two subscribing witnesses, this 4th day of November, A. D. 1889.

WILLIAM D. OLNEY.

Witnesses:
JOHN LOGAN,
E. A. MARSH.